United States Patent [19]
Ryan

[11] Patent Number: 5,377,046
[45] Date of Patent: Dec. 27, 1994

[54] INDICATOR VIEWING ANGLE ENHANCER

[75] Inventor: Robert P. Ryan, Wauwatosa, Wis.

[73] Assignee: Ryan Screen Printing Inc., Milwaukee, Wis.

[21] Appl. No.: 7,194

[22] Filed: Jan. 21, 1993

[51] Int. Cl.[5] .................................................. G02B 5/20
[52] U.S. Cl. ..................................................... 359/599
[58] Field of Search ................................. 359/885, 890

[56] References Cited

U.S. PATENT DOCUMENTS

| | | | |
|---|---|---|---|
| 2,495,697 | 1/1950 | Chilowsky | 359/885 |
| 3,248,050 | 4/1966 | Dickson | 359/890 |
| 4,600,833 | 7/1986 | Shibata et al. | 359/890 |

FOREIGN PATENT DOCUMENTS

| | | | |
|---|---|---|---|
| 4120966 | 7/1992 | Germany | 359/885 |
| 0134203 | 7/1985 | Japan | 359/890 |
| 0223702 | 10/1987 | Japan | 359/885 |
| 0205607 | 8/1988 | Japan | 359/885 |
| 0217302 | 8/1989 | Japan | 359/890 |

Primary Examiner—Edward K. Look
Assistant Examiner—Mark Sgantzos
Attorney, Agent, or Firm—Ryan, Kees & Hohenfeldt

[57] ABSTRACT

The viewing angle and illumination intensity of windows and indicator panels are improved by printing the legends associated with indicator windows on a clear plastic sheet. An opaque ink having a color that contrasts with the color of the printed matter is coated on the backside of the panel with suitable masking so that transparent windows are defined in the panel. A clear tinted ink is coated on the background color coating to impart color to the windows. The next coat is a transparent ink, which contains a white reflective and light-dispersing pigment that makes it translucent. Finally, a coat of a transparent ink is applied and it is cured to produce a textured effect which contributes to the light scattering and diffusing process performed by the white pigment such that when a window is illuminated from the backside, it can be visualized along an optical axis which is almost parallel with the plane of the panel. The various inks that are applied after the windows are created can be combined in many cases to reduce the method to a single coating step. The method can be used to treat large panels where obscuring the individuality of LEDs is sought.

15 Claims, 1 Drawing Sheet

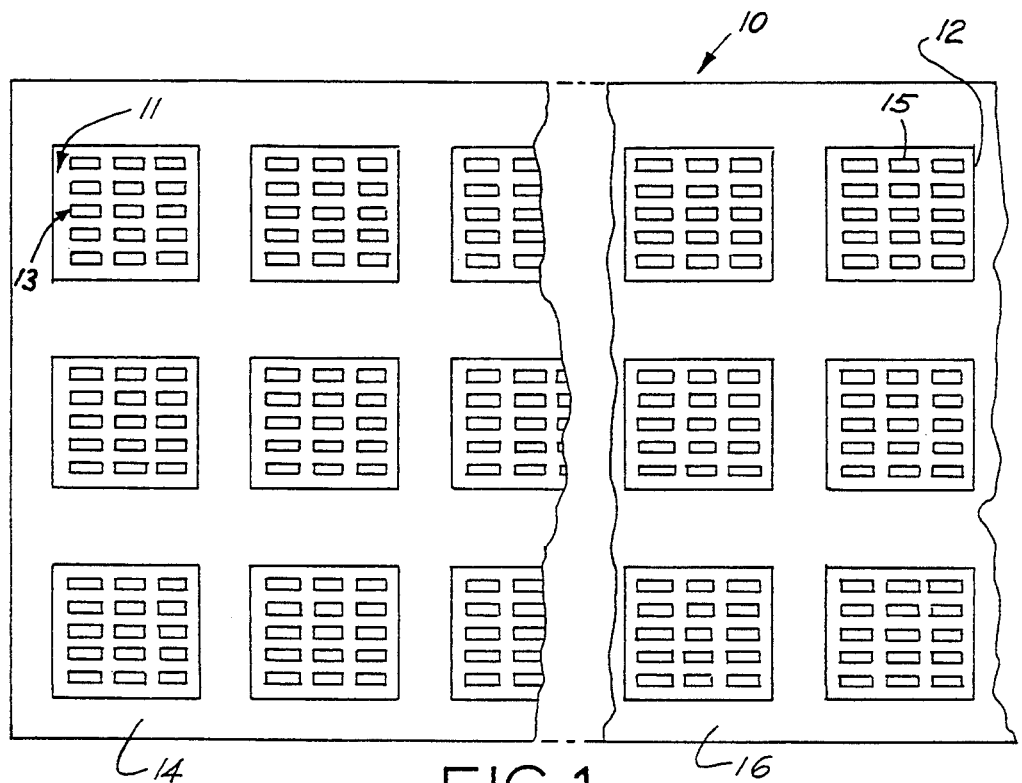
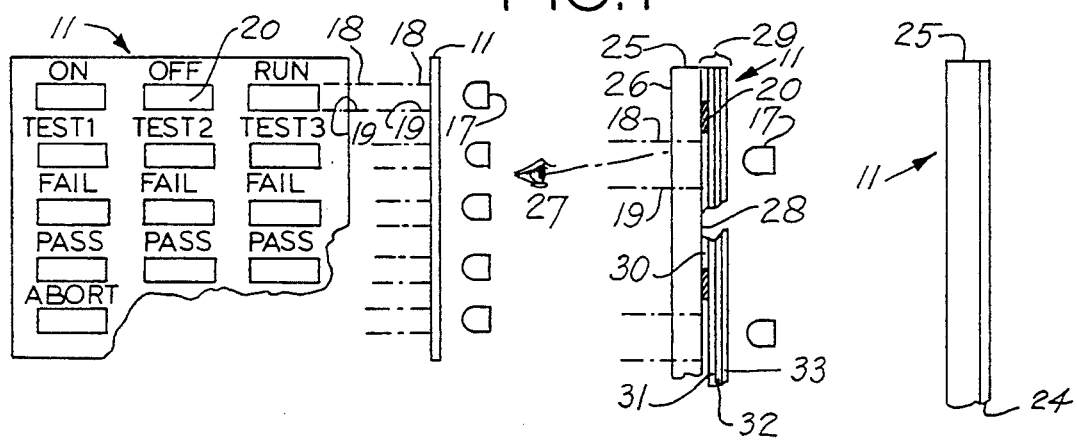
FIG. 2  FIG. 3  FIG. 4  FIG. 5
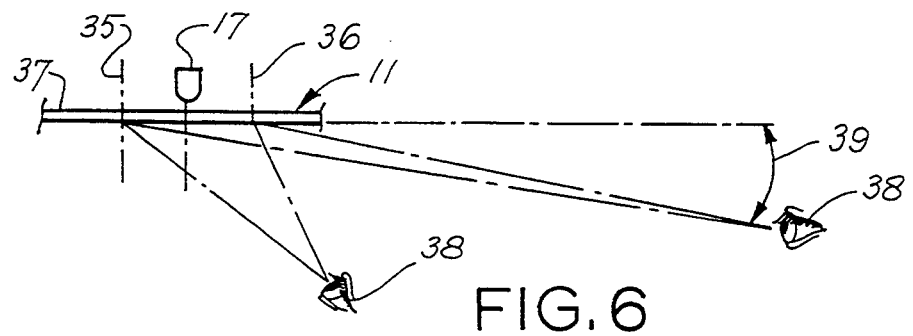
FIG. 6

INDICATOR VIEWING ANGLE ENHANCER

BACKGROUND OF THE INVENTION

The invention disclosed herein pertains to enhancing the visibility of indicator lamps in display panels, particularly, when the indicators are viewed from a substantial distance and at a small angle relative to the plane of the display panel.

Display panels are widely used to indicate to an attendant the state or condition of, for example, a machine part, various electronic circuits, limit conditions, on and off states, and so forth. Such display panels are sometimes mounted on one or more machines which are under the control of a single operator or they may be installed at control stations or consoles where a single operator must observe or respond to indicator lamps associated with the panels turning on or off. One well known type of display panel comprises a transparent substrate or sheet of plastic which has windows, (not apertures) developed on them by printing or otherwise coating the back side of the panel with ink to provide a background color and masking a plurality of areas so that these areas constitute windows. Usually, the substrate or panel sheet is treated on one side with ink as received from the supplier or after having been received which, when cured, results in the rear surface of the sheet assuming a textured appearance. In other words, the sheet becomes translucent rather than transparent. As a result, the window areas are sometimes simply translucent and uncolored whereas in other cases, as a matter of choice, some various colors can be applied to the backside so that some of the windows may have a particular color and other of the windows may have other colors.

Generally, there will be an on/off light source such as an incandescent lamp or more usually a light emitting diode (LED) behind each window. LED's are used in most panels today because they consume less electric power than incandescent indicator lamps. LEDs are available in a variety of colors such as red, orange, green and amber. Almost invariably, there are legends or other graphics printed on the rear side of the panel for being visualized from the front adjacent an associated indicator lamp window. Typically, when a window becomes illuminated as a result of the indicator LED behind it having turned on, the operator-attendant is required to take some action or simply note the indication.

The operator-attendant can usually observe a large number of indicator windows in several panels in the console within a single viewing angle. In other words, when the operator-attendant needs to be concerned only with viewing indicator windows to which the optical axes of the viewers eyes are perpendicular or nearly perpendicular to the plane of the panel, the viewer will have no difficulty in perceiving if the indicator LED is on or off. However, in consoles that have indicator panels extending a substantial distance to the left and right of where the viewer is ordinarily situated, the viewer will not be sure if a window is illuminated or dark. So the viewer must move laterally to obtain more direct alignment with the indicator windows being surveyed in order to be sure if the indicator window is illuminated or not illuminated. A common complaint of those who attend a multiplicity of display panels is that they cannot ascertain if a window is illuminated or not until they move bodily to allow their optical axes to become more nearly perpendicular to the panel. In some cases, such as at a nuclear power plant control console, the inability of the operator-attendant to know when one or more distant indicator windows are illuminated such that an action should be undertaken, may result in severe damage to persons or equipment.

SUMMARY OF THE INVENTION

A general objective of the invention is to provide for increasing the size of the field of indicator panels which a single operator can keep under surveillance from a fixed position. A corollary to this objective is to condition indicator panels in such manner that the viewer or attendant can ascertain if indicator windows at a substantial distance from the operators position are illuminated. In other words, indicator panels treated according to the invention allow the viewer to determine if indicator windows are illuminated in those cases where the operator is so far away from the windows of interest that the acute angle between the plane of the window and the viewers optical axes is much smaller and closer to being parallel to the plane of the panel than is allowed when conventional display panels are used.

In accordance with one embodiment of the invention, preparing a display panel for increasing the distance through which the indicator windows in the panel can be visualized starts with selecting a transparent plastic sheet equal to the size of the panel. This sheet may be 0.010 inch thick by way of example and not limitation. On the back side or the side opposite from the side at which the panel is viewed, graphics or other indicia may be printed. The indicia may be, for example, words such as on, off, run, fail, pass and abort. Or the indicia may be symbols or graphics which are intended to be proximate to the respective windows that are to be created in the sheet. A background color coating comprised of ink or suitable opaque substance is then applied to the back side of the sheet or, in other words, on the side opposite that from which the sheet will be viewed by the attendant. The coatings may be applied using the well-known silk screen process. The silk screen process is a print making process in which a mesh cloth screen is stretched over a frame, and a design is printed on the screen by tusche or stencil. Areas surrounding the design are masked or blocked by a coating that is impervious to ink. A print is made by having a squeegee force ink through the pores of the mesh cloth in the design areas that are not blocked out or masked by an ink impervious glue sizing. Suitable masking of the silk screen, if that is the process by which the background color is applied, results in translucent or light transmissive windows being developed in the sheet contiguous with the printed indicia, usually. The sheet is then coated with an ink, by the silk screen process for example, which, after it undergoes the curing step, imparts to the sheet a textured appearance similar to finely ground glass. The ink that acquires a textured or shrivelled appearance contains extremely fine white particles which may be considered to be a powder and which have the capability of reflecting and diffusing light which impinges on the back side of the windows where the light is derived from an LED that is situated behind each window. This textured coating containing the white substance results in making a window visible from a greater distance and at a smaller acute angle between the optical axes of the viewer's eyes and the substrate sheet. It should be noted that the ink which produces the texture and contains the white particles may also include a non-particulate tint material. The ink required for obtaining the textured coating may be applied by means of lithographic printing or silk screening processes, for example. Silk screening is considered preferable. The textured coating containing the white particles results in the windows becoming visible and perceptible from a greater distance and at a lower or smaller acute angle between the optical axes of the viewer's eyes and the plane of the display panel.

It will be evident in the more detailed description of the invention that the three ink materials can be combined into one or two inks or they can be kept separate and applied in sequence.

The method disclosed herein has applications other than for indicator panels having small windows. The coating method can be used to treat large panels where obscuring light sources such as LEDs is desirable. For example, clocks and the like may use rows and columns of tiny LEDs to define numerals or other characters where sufficiently large individual LEDs are not commercially available. The plastic bezel may reside over the clock face. It is aesthetically undesirable to be able to distinguish the individual LEDs. By applying a tinted ink coating to the backside of the bezel and other diffusing and light scattering inks in accordance with the method described herein, the light rays from the LEDs are scattered such that rows or columns of LEDs look like single illuminated bars or strips which is more natural and more aesthetically pleasing.

How the foregoing and other features of the invention are achieved will be evident in the ensuing more detailed description of the invention which will now be set forth in reference to the drawing.

DESCRIPTION OF THE DRAWING

FIG. 1 is a diagramatic view of part of a control console which contains an array of display panels that extend in directions above and to the left and right of the eyes of a viewer who is attending the console;

FIG. 2 is a fragment of one of the indicator panels that is shown diagramatically in FIG. 1;

FIG. 3 is a side elevation of a portion of an indicator panel;

FIG. 4 is an edge elevational view of a fragment of a panel wherein the substrate is illustrated as being the thickest of the layers and the coatings are markedly exaggerated in thickness for the sake of illustration;

FIG. 5 is similar to FIG. 4 except that the various coatings applied to the substrate are mixed and applied in a single pass, which is implied because of there being only one coating layer on the thicker substrate; and FIG. 6 is a diagram used for illustrating how the viewing angle and distance through which the indicator window can be enhanced by the manner in which the panel is treated in accordance with the invention.

DESCRIPTION OF A PREFERRED EMBODIMENT

Attention is invited to FIG. 1 which depicts some of the indicator panels that make up a console, which requires the attention of an operator, not shown. The console is generally designated by the numeral 10 and contains a plurality of contiguous panels indicated by the reference numerals 11 and 12. It is assumed that a panel such as the one marked 12 is at a substantial distance from the panel marked 11 and that the eyes of the attendant, who must keep the indicator panels under surveillance, may be in a position that is nearer to panel 11 than to panel 12. Panel 11, for example, has columns and rows of imperforate windows, such as the window marked 13. At the outset, it should be understood that these windows are not apertures but are formed by masking ink coatings on a substrate. If the attendant is necessarily in a position nearer to panel 11 and those panels which are next to it, the optical axes of the viewer's eyes will be nearly perpendicular to the plane of the panel 11 and those near it such that it will be easy for the console attendant to ascertain if an indicator window is illuminated. On the other hand, when the attendant is able to look directly at panels in the left section 14 of the console, one would have great difficulty in determining if any one of the windows 15 in the remote panel 12 in the right section 16 is illuminated. In conventional panels and consoles of the type under consideration, the attendant was obliged to move his or her head or make a bodily movement up or down, or to the left and right in order to determine if distant windows are illuminated. This is especially annoying to any person attending panels in a control console, because the person would often like to hold their heads in a single position to give priority viewing to part of the console, while at the same time, the person is obliged to pay attention to the more remotely positioned panels and can only be sure if an indicator lamp is on by moving bodily to a position where the optical axes of the person's eyes are more nearly perpendicular to the plane of the panel.

The array of windows in the panel marked 11 is shown enlarged in the fragmentary FIG. 2 view. It will be evident in FIG. 2 that there are rows and columns of rectangular windows behind which there are light sources such as the light-emitting diodes (LEDs; 17 in FIG. 3). Since the panel is imperforate, the height of a window in FIG. 3, for example, is indicated by dot-dash lines 18 and 19. In FIG. 2, the observer sees the front side of panel 11. The indicia, or legends, adjacent the windows are printed on the backside or the side that is remote from the viewer in FIG. 2, although the legends and indicia can be read by a viewer looking at the front side of the panel. Typical indicia, such as, on, off and run, are given the reference numeral 20.

The manner in which a panel is conditioned for ascertaining if an indicator window is illuminated when the eyes of the attendant are at a substantial distance from the window and when the angle of reflection between the optical axes of the attendant's eyes and the plane of the panel containing the window is very small, will now be explained, in accordance with the invention, in reference to FIG. 4.

In accordance with the invention, an indicator panel or clock face, for example, behind which there will be LEDs is comprised of a substrate sheet marked 25 of clear plastic at the outset. It may be composed of polystyrene, polyethylene, polycarbonate resin or a polyester such as Mylar, for example. The front of substrate sheet 25 is marked 26 for this is the side that is viewed by the observer's eyes 27. The substrate sheet is typically about 0.005" to 0.10" thick and is, of course, greatly exaggerated in thickness in FIG. 4 for the sake of clarity. Thicker sheets are preferably used for clock faces, however. The backside of the clear and transparent substrate sheet 25 is marked 28. The various layers, which are collectively indicated by the numeral 29, are almost immeasurably thin as is the case with ink layers. The backside 28 of substrate sheet 25 is glossy at the outset.

The first step in treating a substrate intended for use as an indicator panel is to print the indicia 20 on the backside 28 while at the same time applying a coating 30 of opaque ink and resorting to suitable masking so that a light transmissive window will be defined between the dashed lines marked 18 and 19 as in FIGS. 2 and 3. After this step is performed, the window is clear and there is opaque ink surrounding the windows. The indicia are directly on the rear face of the substrate so they are always visible from the front. The ink coating is preferably deposited by using silk screen methodology, which in itself is a well-known process. The second step in the process is to apply a clear transparent coat 31 over the opaque background 30. Ink coat 31 may be tinted so that any of the windows that are covered by the coat 31 have color or a tint. By suitable masking, different ones of the windows, or rows or columns of windows, can be differently colored. Transparent tinted coat 31 is also preferably applied by silk screening. If all windows are to be of the same color, tinting may be deferred until the final ink coat is applied as will be explained shortly. The third layer 32 consists of an ink which is transparent and constitutes a vehicle containing white pigment particles that trap the light and reflect the color of the light source. For example, the pigment may be titanium dioxide. The coat 32, which consists of a clear ink in which reflective white pigment is entrained, makes the windows translucent. The concentration of the pigment should be controlled so that the degree of translucence is not so great as to require exceedingly high-intensity light sources 17 to penetrate it. As indicated, the use of LEDs 17 for the indicator light sources is preferable and has the advantage of consuming less electric power and radiating less heat than incandescent indicator lamps.

The last step in the version of the process being described in connection with FIG. 4 is to deposit a final coat 33 on underlying coat 32. Coat 33 is a texture coating that diffuses or scatters the light, thereby diffusing and obscuring the LED light source behind the window and spreading the light across the surface of the window. For example, if the ink is deposited on a clear plastic substrate with nothing more and the substrate is cured such as by exposing it to ultraviolet light, the ink will become textured which by itself is a known property of the ink. That is, it will take on the appearance of ground glass. After the texture coat 33 is cured, the display panel is ready for use. In an installation, of course, there would be LEDs 17 mounted behind each window in the panel. Experience has shown that good enhancement of the windows is achieved if the LEDs are located about one-sixteenth of an inch (1.6 mm) from the backside of the panel.

It is to be noted that the composition of final coat 33 is a transparent ink that may contain the color tint. The reason for tinting is that when the indicator LED is extinguished, there is still an apparent color in the window area. As mentioned earlier, the second step coating 31 ink may contain the tinting material. It has been discovered that when a light source or LED having the same hue as the tinted ink is placed behind the window, the color of the window is emphasized. For example, if the tint is green and an ordinary incandescent lamp that emits white light is behind the window, the window appears light green, or slightly faded. If a light source, such as an LED 17 that emits green light, is used, the green tint is intensified and enriched when the LED is turned on. A similar phenomenon can be obtained with tints that match the colors of other LEDs that are available.

To summarize the method for enhancing visibility of indicator panel windows, the graphics and opaque coating are applied to the back side of the substrate and the windows are masked and clear. A tinted ink is then applied to all of the windows in the panel or inks of various tints are applied to selected windows. Next, an ink containing reflective particles is applied. In some cases, it is practical to tint the coat that contains the reflective particles so the preceding separate tinted coat is avoided. Finally, a clear ink that is susceptible to developing a texture when appropriately treated is applied. Where the coating materials are inks such as are used in silk screening processes, the texture is developed by exposure of the panel to ultraviolet radiation for texturing and then to intense ultraviolet radiation to cure the ink.

The term ink is used herein in a generic sense to encompass inks used in silk screening. Those inks comprise known volatile vehicles. It should be understood, however, that inks falling within the family of lacquers such as inks based on epoxy and acrylic resins in appropriate solvents or volatile vehicles may be used.

The FIG. 5 embodiment is based upon the principles just discussed but with some simplification in the process. In FIG. 5, the clear substrate 25 has a coat 24 that is applied in one pass but contains a mixture of components. This is done after the graphics are applied and the opaque coat with windows has been applied. For example, the white light-dispersing pigment or particles used in coat 32 in the FIG. 4 embodiment is mixed with the clear ink that becomes textured when it is cured. A clear, tinted ink can be mixed with the texturing ink and particles, and the mixture can then be applied with a roller or by silk screening. The substrate 25 with the coating 24 on it is passed through a curing chamber where the inks are exposed to ultraviolet radiation and, ordinarily, in a nitrogen gas ambient. However, the method is not restricted to using ultraviolet-radiation curable inks. The ink could be one that is cured by gas drying, or acrylic and epoxy inks can be used. Generally, any ink that allows application to the glossy back surface of the substrate and that results in a texture can be used. The amount of texture alters the degree of light diffusion.

FIG. 6 is a diagram for demonstrating the merits of display panels that are treated as just described. FIG. 6 shows a section of a panel 11 in which there is a window whose lateral boundaries are indicated by the dash-dot lines 35 and 36. An LED 17 is situated behind the window. If the panel 11 were of the conventional type, the areas 37 around the window and on the backside of the panel would have a coat of ink that provides contrast with the window. There may be, and usually is, tinted ink applied over the background coat 37 so that the windows have particular colors to distinguish those which are indicative of one condition from those which are indicative of another condition. In this conventional panel design, an observer observing along a line of sight or optical axis that is perpendicular to the window will see the window illuminated when LED 17 is turned on. As the optical axis of the eye 38 of the observer shifts from perpendicularity with the panel, the window gets less brilliant. When the eye 38 is positioned so that there is a relatively small angle 39 between the optical axis", or line of sight and the plane of the panel, the observer will ordinarily not be able to determine if the window is illuminated or not. In the real world this means that anyone who is attending panels made in the conventional way will have to make a bodily shift from one position to another to determine if indicator windows at some distance from the initial position of the observer are illuminated.

Referring to FIG. 6 again and assuming that the backside of the panel is treated as described in connection with discussing FIGS. 4 and 5, the observer's eye 38 perceives a bright window, which is, insofar as one can detect, as bright as if the observer were looking directly at the window. The effect is surprising and uncanny. Tests with various subjects have demonstrated that the eye can be at a substantial distance laterally of the window and so close to the extended plane of the panel that the angle 39 can be characterized as a grazing angle, and yet the window appears to be at full brightness. This is greatly appreciated by operators who must attend large consoles with indicator panels spread out over a great area, for it eliminates or at least substantially reduces the need for shifting ones head a great distance to be certain whether one or more remotely positioned indicator windows are illuminated or not.

Although illustrations of the composition of the new panel and the method of making it have been described in considerable detail, such description is intended to be illustrative rather than limiting, for the invention may be variously embodied and is to be limited only by interpretation of the claims which follow.

I claim:

1. A method of conditioning a light transmissive substrate panel having a front viewing side and a rear side for diffusing the light emitted by a low intensity light source positioned behind the rear side of the panel oppositely of the viewing side of the panel, comprising the steps of:
   applying to said rear side of the panel a coat of an ink in which light dispersing particles are entrained, and
   applying over said coat a coat of an ink that is susceptible to becoming textured when subjected to curing, and
   exposing the panel to a curing environment.

2. The method according claim 1 including in the ink that entrains the fine particles a tinting material.

3. The method according to any one of claims 1 or 2 wherein the curing environment to which the rear side of the panel is exposed is an ultraviolet radiation environment.

4. The method according to any one of claims 1 or 2 wherein applying said coats is accomplished by silk screening.

5. A method of conditioning an indicator panel having a front viewing side and a rear side containing at least one light transmissive indicator window and a low intensity light source behind the at least one window at the rear side of the panel such that an observer can perceive at a greater lateral distance from the window and at a smaller angle between the observer's optical axes and the plane of the panel if a window is illuminated, comprising the steps of:
   applying a coat of opaque ink to the rear side of a light transmissive panel and masking to define at least one window,
   applying a coat of ink in which light reflective particles are entrained over the window,
   applying a coat of ink that is susceptible to becoming textured when subjected to curing, and
   exposing the panel to a curing environment.

6. The method according to claim 5 and including in said ink that contains the particles a tinting material for imparting color to the window.

7. The method according to any one of claims 5 or 6 wherein applying of said coats is achieved by silk screening.

8. The method according to claim 7 wherein the curing environment to which the rear side of the panel is exposed is an ultraviolet environment.

9. The method according to claim 5 including the step of printing graphics on the rear side of the panel before applying the opaque ink.

10. A method of conditioning an indicator panel having a front viewing side and a rear side containing at least one light transmitting indicator window and a low intensity light source behind the at least one window, at the rear side of the panel such that an observer can perceive at a greater lateral distance from the window and at a smaller angle between the observer's optical axes and the plane of the panel if a window is illuminated, comprising the steps of:
   applying a coat of opaque ink to the rear side of a light transmissive panel and leaving at least one area in the opaque coat bare to define at least one window,
   applying over said window a coat of a mixture comprised of an ink containing light reflective particles and an ink that is susceptible to becoming textured when subjected to curing, and exposing the panel to a curing environment.

11. The method according to claim 10 wherein said mixture also includes tinting ink.

12. The method according to any one of claims 10 or 11 wherein coating with the mixture is accomplished using silk screen printing methods, and curing is accomplished by exposing the panel to ultraviolet radiation.

13. The method according to claim 10 including the step of printing graphics on the rear side of the panel before said opaque ink is applied.

14. An indicator panel comprising:
   a light transmissive panel having a front viewing side and a rear side for being presented to a low intensity LED light source,
   a coat of opaque ink on said rear side with at least one area uncoated to define a window, and
   a coat on said window comprised of ink in which light reflective particles are entrained and a coat of textured ink on said coat that contains said particles.

15. The panel according to claim 14 wherein the coat over said window includes tinting ink.

* * * * *